US006260026B1

United States Patent
Tomida et al.

(10) Patent No.: US 6,260,026 B1
(45) Date of Patent: Jul. 10, 2001

(54) CREDIT CARD INFORMATION MANAGEMENT SYSTEM

(75) Inventors: Yoshikazu Tomida, Hirakata; Tatsuo Hiramatsu, Musashino; Naruto Nishimura; Hironori Mitoh, both of Osaka; Seiji Suzuki, Higashiosaka; Masahiro Sata, Sakai; Masahiro Seto, Suita; Ryuuji Yoshihara, Higashiosaka; Hiromichi Suzuki, Tokyo; Tadashi Etoh, 9, Haraikatamachi, Shinjuku-ku, Tokyo, all of (JP)

(73) Assignees: Kabushiki Kaisha Media Marketing Network, Tokyo; Sanyo Electric Co., Ltd., Moriguti; Tadashi Etoh, Tokyo, all of (JP)

( * ) Notice: Subject to any disclaimer, the term of this patent is extended or adjusted under 35 U.S.C. 154(b) by 0 days.

(21) Appl. No.: 08/900,839

(22) Filed: Jul. 25, 1997

(30) Foreign Application Priority Data

Aug. 12, 1996 (JO) ................................... 8-212803
Sep. 20, 1996 (JP) ................................... 8-250003

(51) Int. Cl.$^7$ .................................................. G06F 17/60
(52) U.S. Cl. ................................. 705/38; 705/16; 705/17
(58) Field of Search .................................... 235/375, 380; 395/200.3, 200.31; 705/1, 16, 17, 38; 709/200, 201

(56) References Cited

U.S. PATENT DOCUMENTS 3,719,927 * 3/1973 Michels et al. ................. 340/825.33
4,908,521 * 3/1990 Boggan et al. ....................... 235/380
4,943,707 * 7/1990 Boggan ................................. 235/380

FOREIGN PATENT DOCUMENTS 10-55385 * 2/1998 (JP) .
10-97572 * 4/1998 (JP) .

OTHER PUBLICATIONS

Houlder: "Technology (Worth Watching): Have card, will travel (Card Technologies Australia and Transcard (Australia) developed contactless smart card that covers trains, buses and taxis)", Financial Times London Edition, Mar. 23, 1995, p. 16.*

* cited by examiner

Primary Examiner—Edward Cosimano
(74) Attorney, Agent, or Firm—Kanesaka & Takeuchi

(57) ABSTRACT

The credit card information management system checks the creditability of a credit card intended to be used for purchase of goods or service by using the card information owned by member stores of credit companies. A host computer of the card management center outputs information regarding the validity or invalidity of a credit card of a customer member of a credit company as card information, a transmission facility wirelessly transmits digital data of the card information. A receiving facility of a member store receives radio signals of the card information and checks whether or not there is any missing of data. If any missing occurs, a transfer of the missed data is requested to the host computer. A terminal computer extracts only the card information necessary for one's own store from the data outputted by the host computer and data outputted in response to the transfer request and stores the same in memory, and the terminal computer outputs judgement of validity or invalidity of a credit card inputted into a card reader.

4 Claims, 9 Drawing Sheets

| SERVICE IDENTIFICATION | DECODE IDENTIFICATION | INFORMATION TERMINATION | DATA GROUP NUMBER | DATA PACKET NUMBER |

| PREFIX | 0 | DATA |
| PREFIX | 1 | DATA |
| PREFIX | 2 | DATA |
| PREFIX | 3 | DATA |

CREDIT CARD INFORMATION MANAGEMENT SYSTEM

BACKGROUND OF THE INVENTION

The present invention relates to a system for managing credit card information.

In cases where goods or service (hereinafter called merely "goods") is purchased by using a credit card, a "charges forward contract" of goods is concluded between a credit user and a financial company such as a credit company (hereinafter merely called "credit company") in addition to a "purchase contract" concluded between the credit user and a member store, wherein in order to protect the credit it is indispensable for credit companies to collect information (hereinafter called credit information) for judging the payment capability of credit users, and since only the information owned by one credit company is insufficient, several credit information organizations are established to exchange credit information owned by several credit companies.

Delay of the payment to a credit company and insolvency are registered in the information list as "accident information", and a person with such a description on the information list is no more newly given any credit by a credit company. Therefore, such an information list is called "black list".

There are four credit information companies in Japan as credit information organizations, that is, bank-oriented organization, credit company oriented organization, white collar worker financing company oriented organization, and foreign credit company oriented organization. Information for distinguishing credit users (name, address, date of birth, etc.), information pertaining to credits (description of transactions, date of transactions, remaining credit amount, etc.) and accident information (delay of payment, insolvency, bankruptcy, etc.) are accumulated by these information centers. Credit information has been exchanged among the former three information centers in Japan since 1987.

A credit user is a member of a credit company and, a store or a shop is a member store of the credit company. Although a card management center is an information center of a credit information organization, the card management center may be a financial organization such as a credit company or other organizations.

When a member buys goods or service at a member store, using his credit card, the member shop must carry out a check of his creditability by checking whether or not his credit card is valid or whether or not the purchase is within the utilization limit (credit limit).

The checking is carried out by reference to the card management center by telephone or confirming a "List of invalid cards" equipped in member stores, whereas on-line reference by CAT has been recently prevailed.

The checking of the creditability of members should always be carried out on the basis of the newest information as a card utilization and credit management system. In a case of checking by reference to the "List of invalid cards" equipped in member stores, it is impossible to check the changes of credit card validity between the day of issuance of the list and the day of checking.

In a case of checking by reference to the card management center by telephone, although it is possible to acquire the newest information obtained by the card management center as a rule, there are some shortcomings that an accident may be presumed to occur due to "mishearing" because of manual communications and it takes a little longer time to confirm the creditability of credit users.

In view of these points, the CAT on-line reference is able to prevent an accident due to "mishearing" from occurring, to check abnormal utilization of doing "shopping at several stores" over the utilization limit in a short time, and to prevent illegal use of stolen cards from occurring.

However, in a case of the CAT reference method, it is the same as the abovementioned checking method by telephone with respect to carrying out a check using a telephone line. The use frequency of the CAT is remarkably increased in busy seasons such as Bon Festival or Christmas season, whereby since there arise several problems that the telephone lines are busy, the response of the card management center is delayed, etc., excessive facility investment is unavoidable to meet the peak demand. Furthermore, member stores must pay telephone charges, and when a credit company utilizes the CAT of a credit information organization, the credit company also pay the cost for the CAT management.

As described above, with respect to checking the creditability of members, since conventionally the whole information pertaining to the creditability of members exist in a card management center, the checking of creditability has been carried out by making a response to an inquiry from member stores. Therefore, there are some limitations in shortening the handling time of the checking of creditability.

SUMMARY OF THE INVENTION

It is therefore an object of the invention to provide a credit card information management system which are able to read the newest card information including the creditability information of members, which is inputted in a terminal device equipped in a member store.

With the invention, it is possible to judge whether the credit card to be used by a credit card member is valid or invalid and further to check the limit of creditability by a terminal device of a member store receiving information transmitted by the card management center. Furthermore, the card information is always renewed to be the newest information, and further the terminal device of a member store is able to detect any missing of the information data with respect to the card information received by the card management center, wherein if any missing occurs, the terminal device is able to request the card management center to transfer the missed data of the card information and formally store the received data in memory. Also, with the invention, the card information is digital data which is radio-transmitted, and if there is any missed data, a transfer request and response for the transfer request are effected by a telephone line.

DESCRIPTION OF A PREFERRED EMBODIMENT OF THE INVENTION

Figure 1:
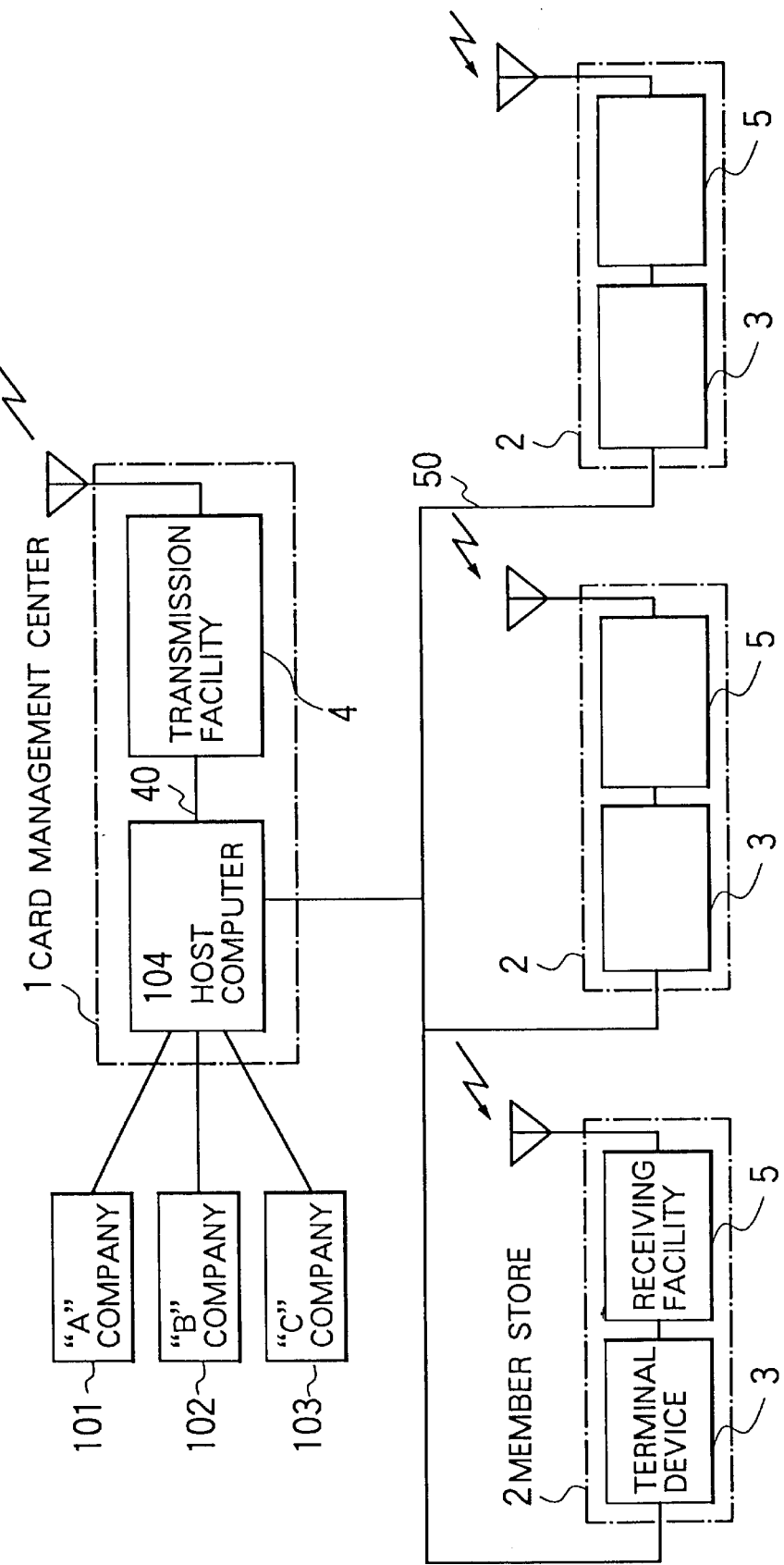
FIG. 1 is a diagram showing the basic configuration of the invention.

Hereinafter, a description will be given of a preferred embodiment of the invention with reference to the accompanying drawings. In FIG. 1, information pertaining to the creditability of credit cards (hereinafter called card information) is transmitted from a card management center 1 of a credit information organization to terminals 3 of the respective member stores 2, wherein the terminals 3 of the respective member stores 2 always have the newest card information which can be freely taken out as necessary.

Information necessary to judge whether the cards are valid or invalid with respect to all the credit cards of customers is inputted from time to time in a host computer 104 equipped in the card management center 1 by the respective credit companies 101,102,103, and the information is transmitted to receiving facility 5 of the respective member stores 2 through a transmission facility 4.

Figure 2:
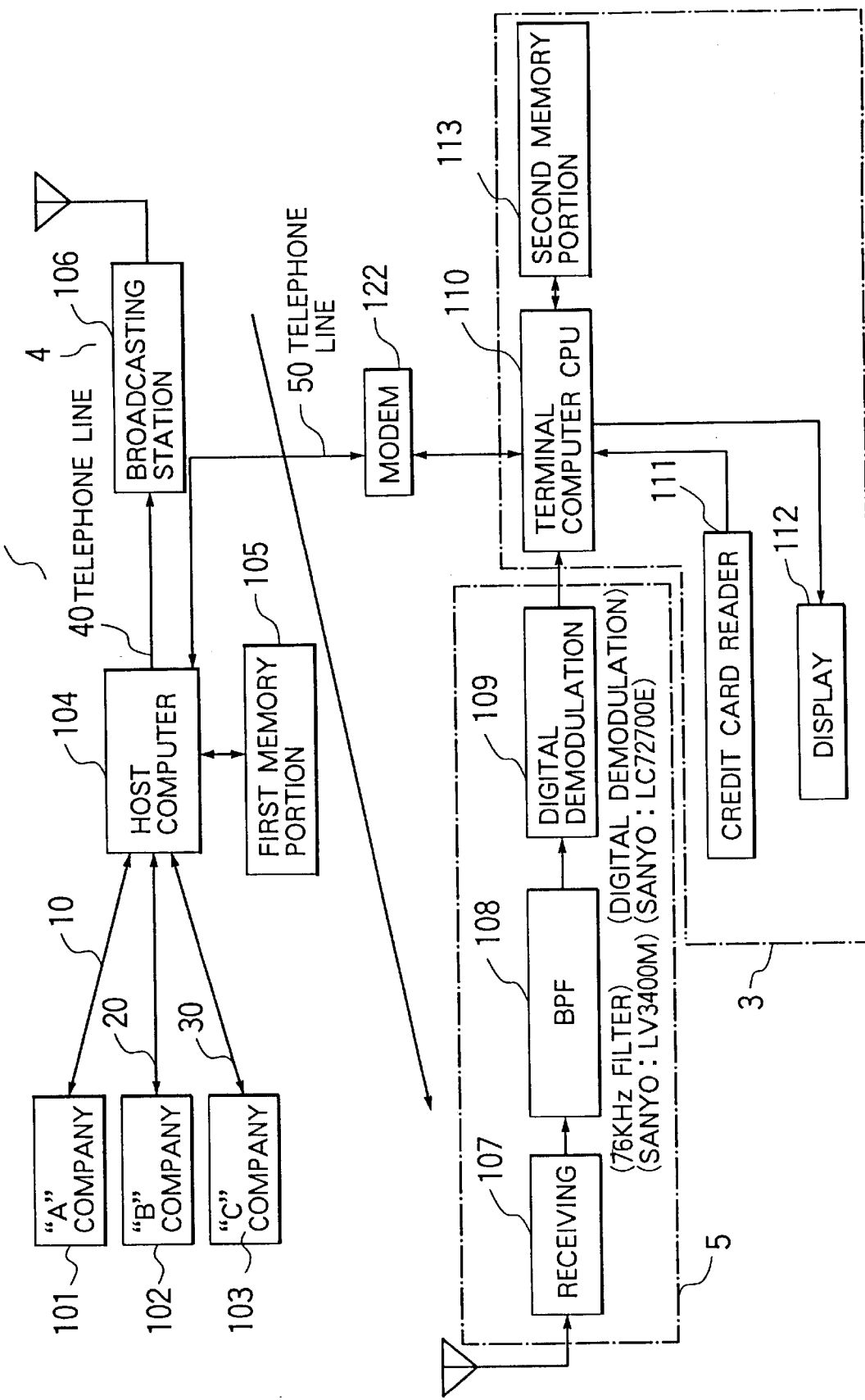
FIG. 2 is a diagram showing a construction of a card management center and member stores.

In FIG. 2, the respective credit companies 101,102,103 send the card information of customer members to the host computer 104 of the card management center 1 as digital data through the respective telephone lines 10,20,30, and the host computer 104 processes the data sent by each credit company and transmits the data of the card information to the transmission facility 4. 105 is the first memory portion of the host computer 104, in which the card information sent from each of the credit companies is stored in memory. The transmission facility 4 is a facility for transmitting digital data of the card information as radio signals. The transmission facility 4 may utilize a broadcasting station 106. When the broadcasting station 106 is utilized, digital data of the card information is transmitted from the host computer 104 of the card management center 1 to the broadcasting station 106 through a telephone line 40, wherein the card information is broadcasted by the broadcasting station 106. In the invention, in a case where the broadcasting station 106 is utilized for a transmission facility 104, the broadcasting station 106 carries out a part of the functions of the card management center 1.

Each of the member stores 2 has a receiving facility 5, a terminal computer 110 of the host computer 104 as a terminal device 3, and a card reader 111 of credit cards. The receiving facility 5 consists of a receiving portion 107, a band pass filter 108 and a digital demodulator 109. The receiving portion 107 receives electric waves transmitted from the broadcasting facility 4 and outputs digital modulation signals. The digital modulation signals are caused to pass through the band pass filter 108. Furthermore, they are reproduced as digital data by the digital demodulator 109 and inputted into the terminal computer 110. The terminal computer 110 receives the reproduced card information and processes the digital data to store all the inputted data or extracted data in the second memory portion 113 and to control a card reader 111 and display 112.

The card reader 111 reads the ID number of a card of the inputted customer member and outputs the content to the terminal computer 110. The terminal computer 110 judges whether the inputted credit card is valid or invalid, on the basis of the data read from the memory feature (i.e., the second memory portion) and outputs the same on a display 112.

Furthermore, since the host computer 104 of the card management center 1 and a terminal computer 110 of member stores 2 are connected to each other by a telephone line 50, and the respective terminal computers 110 is provided with a modem 122 used to be connected to a telephone line 50. The telephone line 50 is a line for requesting a transfer of data when the card information transmitted from the transmission facility 4 of the card management center 1 is partially missed and for receiving the missed data from the host computer 104. Therefore, the line may not be necessarily a telephone line, but the same may be an exclusive communication line.

With the invention, transmission of the card information between the card management center 1 and the respective member stores 2 is a unidirectional communication in which the card information is transmitted from the card management center 1 side to the member store side in one direction, and the transmission is achieved by utilizing data broadcasting such as FM character multiplex broadcasting, etc. That is, the broadcasting station 106 may be a broadcasting station having an FM multiplex broadcasting facility.

Figure 3:
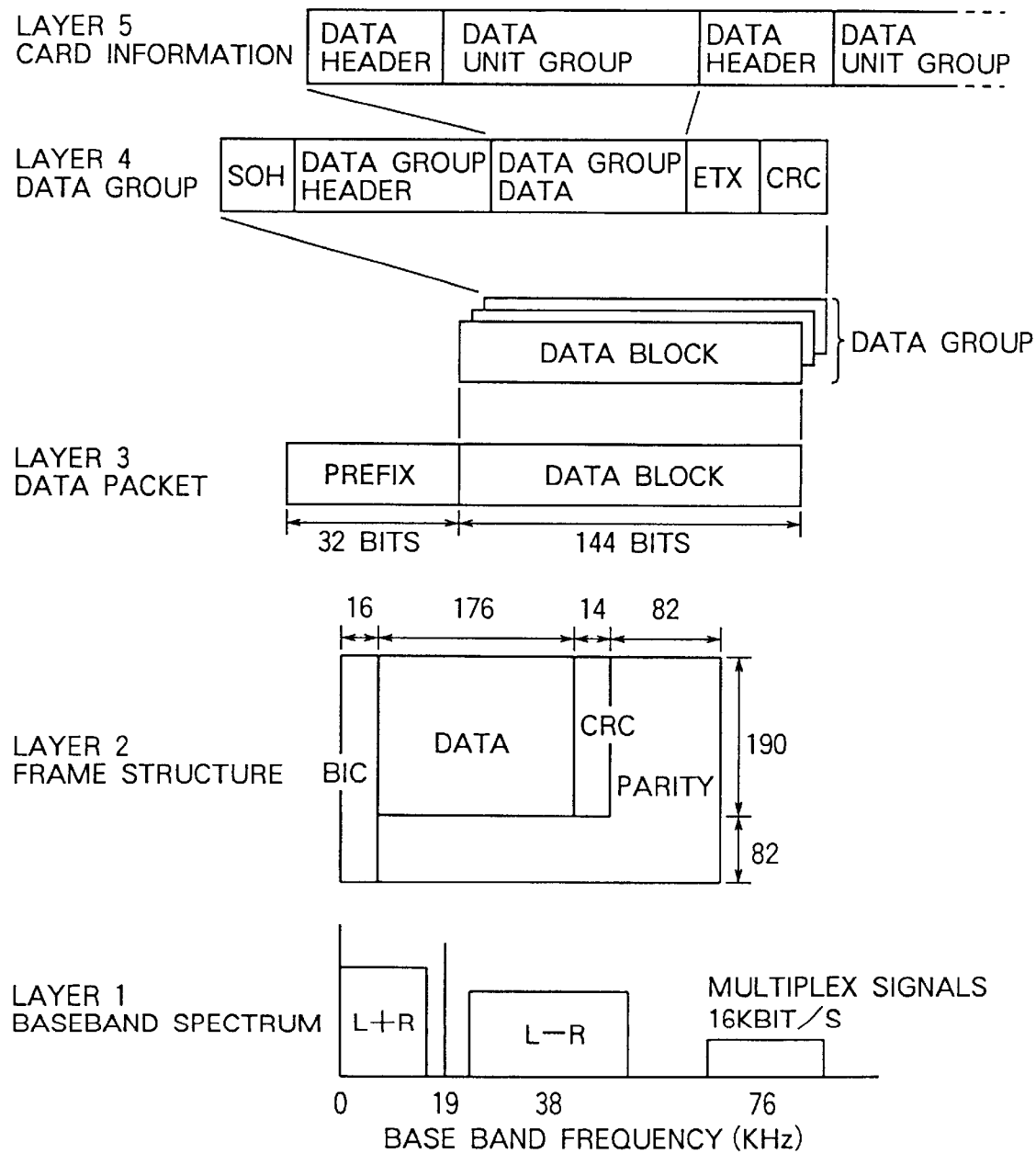
FIG. 3 is a view showing the protocol of an FM multiplex transmission system.

The FM multiplex broadcasting is effected by a system in which new signals are multiplexed to higher frequency than stereo sub channel signals and simultaneously FM modulated for broadcasting, and there are several systems which are DARC system, fixed receiving system, RDS system, and other systems. The protocol of the DARC system disclosed in a literature "Proc. of Vehicle Navigation & Information Systems Conference (1994) A4–2, Pages 111 through 116" is shown in FIG. 3. In FIG. 3, Layer 1 designates the characteristics of a transmission pass, wherein multiplex signals are overlapped at the higher frequency side than L–R signals in addition to the L+R signals and L–R signals which are usual FM stereo broadcasting signals.

Layer 2 regulates a frame configuration of data, including an error correction system. Each of the frames consists of 272 blocks in the row direction, and a 16-bit BIC (Block identification code) is added to the leading top of each block. Based on this BIC, frame synchronization and block synchronization are secured. 190 blocks of 272 blocks in the row direction are packets for transmitting data, and 82 blocks thereof are parity packets for transmitting parity in the row direction. Each packet for transmitting data is composed of an information section of 176 bits in the line direction, CRC (Cyclic Redundancy Code) of 14 bits, which is an error detection code, and a parity section of 82 bits.

That is, as for the transmission data, this one frame is regarded as a basic unit, and an error correction is carried out in this layer.

Layer 3 regulates a construction of data packets. A data packet consists of 176 bits excluding BIC, CRC and parity of each line in the frame.

Furthermore, this data packet is composed of prefixes and data blocks. The prefix includes information pertaining to the packet.

Figures 4, 5, 6:
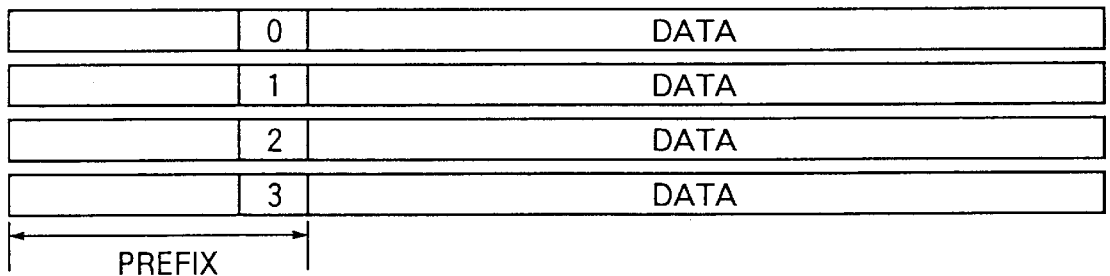
FIG. 4 is a view showing a construction of prefixes.
FIG. 5 is a view showing a packet construction.
FIG. 6 is a view showing another packet construction.

FIG. 4 shows the configuration of prefixes. The service identification classifies the contents of services of information in a packet, for example, information of creditability, control information to a CAT terminal, and other services. The code identification is information related to error correction method. The information termination is effected by judging the final packet of a series of information. The renewal is incremented in a case where the data content is revised. Contrarily, in a case where the same data continuously exist in the revised content and in the data group number and data packet number, it is considered that the same data is transmitted again. The data group number expresses the kind of data groups, wherein different numbers are assigned to each of credit companies, for example, "A" company 101, "B" company 102, etc. The data packet number expresses the packet number. FIG. 5 shows the configuration of packets. In a case of continuous packets, the data packet numbers are incremented one by one.

Layer 4 regulates the configuration of data groups. The data group consists of one or a plurality of data blocks. That is, the data groups may be constructed by arranging data packet numbers from "0" to the data block, at which the information termination flag is provided in a prefix, in the order of the data packet numbers on the basis of the information in the prefix in the data packets. This data group also includes a CRC, which is an error detection code, whereby any error in the card information data can be detected in this layer.

Layer 5 constitutes a set of information data, which is transmitted by the FM character multiplex broadcasting, that is, a data unit in which data groups including card IDs, credit information, amount of credit limit, etc. for each of credit companies are consolidated. Furthermore, several transmission methods are considered, for example, data unit groups are constructed with data supplied by several credit companies.

Figure 7:
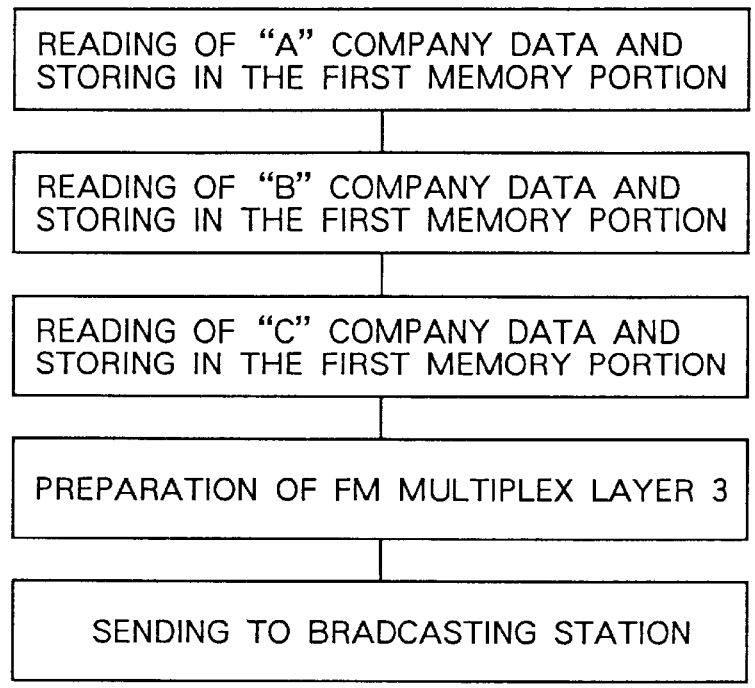
FIG. 7 is a view showing processing descriptions by a host computer.

FIG. 7 shows a processing sequence of the host computer 104. The host computer 104 firstly reads the data of, for example, "A" company 101 in some credit companies ("A" company, "B" company, "C" company) 101, 102, 103 through a telephone line and stores the data in the first memory portion 105. Similarly, the host computer 104 reads the data of "B" company and "C" company and stores the same in the first memory portion 105. Thereafter, the host computer 104 prepares packet data belonging to the layer 3 of the FM multiplex broadcasting illustrated in FIG. 3 in compliance with the data stored in the first memory portion 105.

Figure 8:
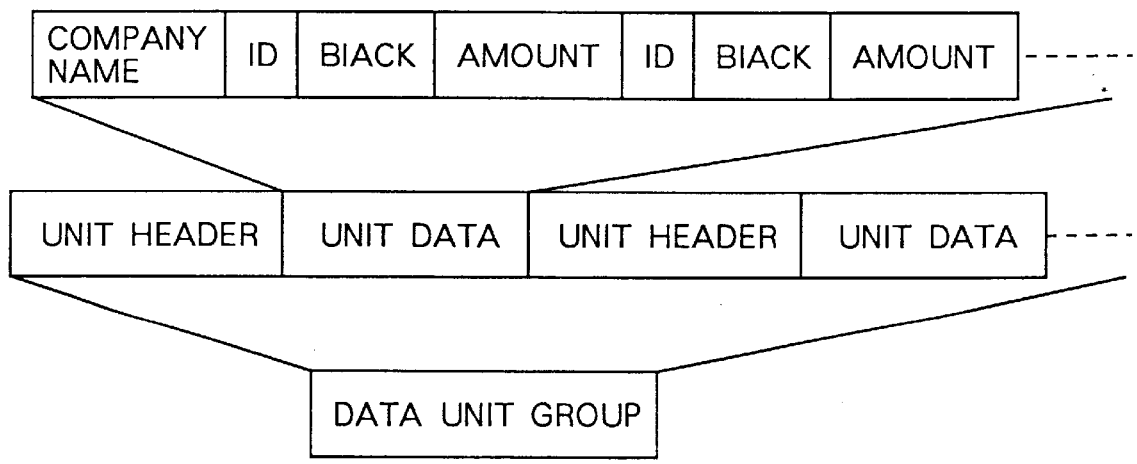
FIG. 8 is a view showing a construction of data unit groups.

The data contained in the layer 3 is prepared on the basis of the layer 5 which is a group of data units. The data contained in the layer 5 consists of unit groups. FIG. 8 shows the configuration of unit groups and data example in the units. Each of the units is composed of a unit header, which exists at the beginning of units without fail, and unit data being actual data. The unit data commences with the name of company showing to which credit company the data belongs, and the same includes an ID number of credit card, a code pertaining to whether or not the ID number is listed in the "black list", further purchasable amount within the limit, other ID numbers, etc. in the order.

Although, in the abovementioned preferred embodiment, a company name is described at the beginning of the unit data. Some other constructions are available, for example, one of which is such a construction where a company name exists before the ID number without fail and data of several credit companies are mixed in the same unit, and the other of which is such a construction where the unit is compressed by using a data compression method to cause the quantity of the data to be decreased. The packet data of the layer 3 is transmitted to a broadcasting station 106 through a telephone line 40, and the card information broadcasted in a wave form from the broadcasting station 106.

Figure 9A:
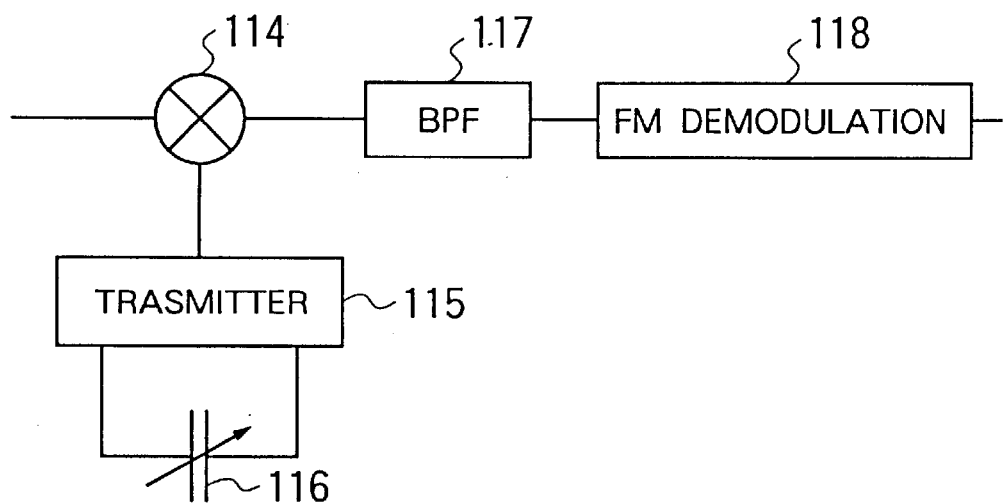
FIGS. 9(a) and 9(b) are views showing a receiving portion of a receiver at the member store side.
Figure 9B:
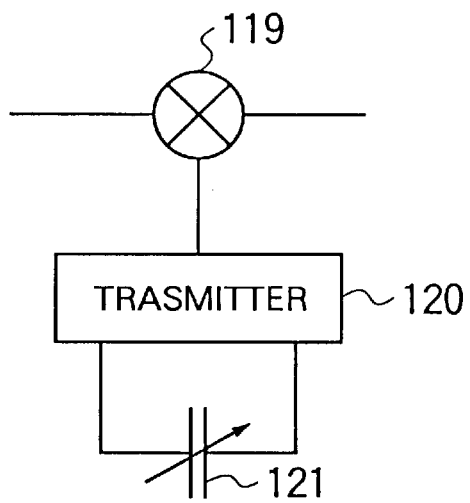

The data of broadcasted card information is received by a receiver 5 of each of member stores 2. FIGS. 9(a) and 9(b) show a construction of the receiving portion 107 of the receiver, wherein FIG. 9(a) shows an example showing a case where the data is transmitted by FM multiplex transmission system, and FIG. 9(a) shows an example showing a case where a mixer 114 multiplies input signals by the output of a transmitter 115 and the multiplication signals are outputted into a band pass filer 117. The transmitter 115 transmits at a simplex frequency, and a variable capacitor 116 is able to set the frequency of the transmitter 115 to an appointed value. Only the necessary components of the multiplication signals are taken out from the band pass filter 117, and FM sound signals and FM multiplex signals are taken out from an FM demodulator 118. These signals are allowed to pass through the band pass filter 108 illustrated in FIG. 2, wherein only the FM multiplex signals are taken out. The FM multiplex signal is a kind of digital modulation signal, and the same is demodulated to digital data by a digital demodulator 109 and is inputted into a terminal computer 110.

For example, it is assumed that FM broadcasting of 80 MHz is inputted into a mixer 114. Since the IF frequency of FM demodulation is usually 10.7 MHz, the transmitter 115 adjusts the transmission frequency by using the variable capacitor 116 to cause the transmission frequency to become 69.3 MHz. Resultantly, the output of the mixer 114 will be 10.7 MHz and 149.3 MHz. Since the necessary component is only 10.7 MHz, the band pass filter 117 is able to take out only the components of 10.7 MHz. Thereafter, the FM demodulation is carried out by a FM demodulator 118, thereby taking out FM sound signals and FM multiplex signals. Furthermore, the FM sound signals are cut by the band pass filter 108. Herein, although the construction is described in compliance with a method for adjusting the tuning frequency by a variable capacitor, a method for adjusting the same by PLL may be employed.

FM multiplex broadcasting is employed in FIG. 9(a). However, since no sound signal is required in this system, there is no necessity that data is transmitted by an FM multiplex system. Therefore, FIG. 9 (b) shows an example of transmitting data by using MSK signals which are of a type used for FM multiplex signals. 119, 120, 121 are a mixer, a transmitter, and a variable capacitor in the order, and their functions are the same as those of 114, 115 and 116 in FIG. 9(a). In FIG. 9(b), no FM demodulation is required in order to obtain FM multiplex signals, and 76 KHz which is the carrier frequency of FM multiplex signals may be used as IF signals.

For example, it is assumed that the carrier frequency is 900 MHz; a transmitter 120 transmits 899.924 MHz, wherein 76 KHz and 1799.924 MHz are obtained as a mixer output. 1799.924 MHz is an unnecessary component which will be cut by a band pass filter 108 coming thereafter.

Thus, it is possible for the receiver 5 to obtain MSK signals of carrier 76 KHz. The band pass filter 108 is a 76 KHz filter, and LV3400M which is a LSI made by SANYO Electric Co. Ltd., may be used. This filter is able to eliminate unnecessary signals such as FM sound signals.

Figure 10A:
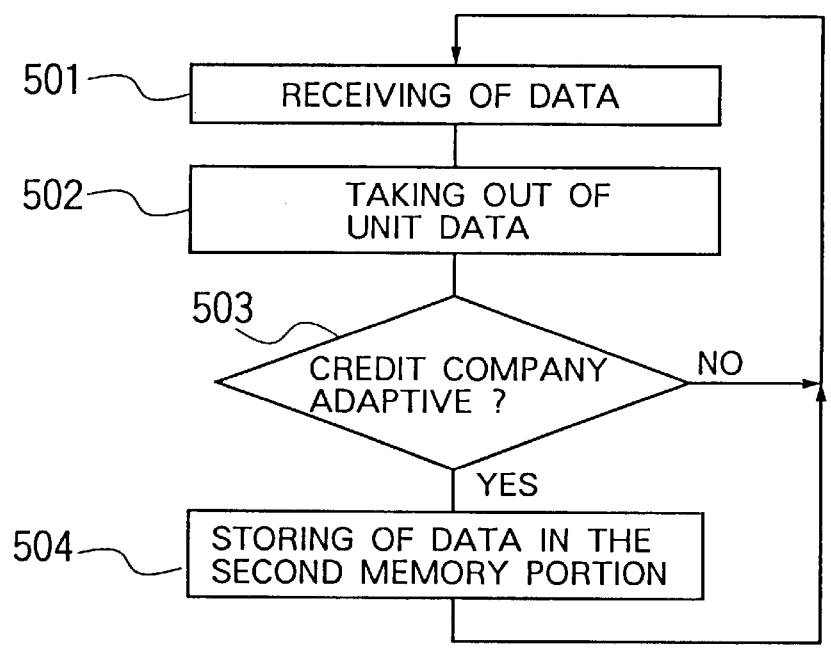
FIGS. 10(a) and 10(b) are flow charts of processes of a terminal computer at a member store.
Figure 10B:
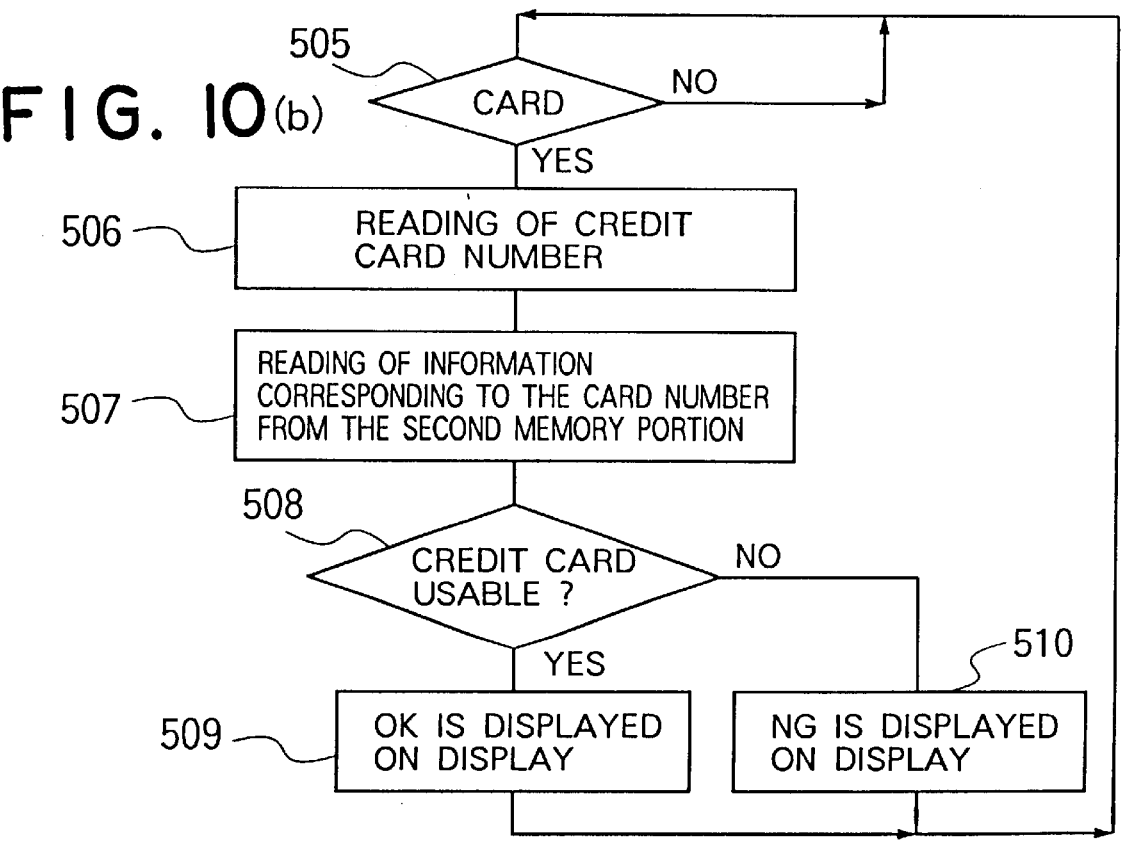

The digital demodulator 109 is an LSI for MSK demodulation, and LC72700E, which is an LSI made by SANYO Electric Co. Ltd., may be used, whereby it is possible to obtain digital data by MSK signals. The digital data can be processed by a terminal computer 110. Flow charts of FIGS. 10(a) and 10(b) show processes thereof. The processes for the terminal computer 110 are only two kinds, one of which is storing of card information data and the other of which is reading of the card information.

FIG. 10(a) shows a storing process of the card information data, wherein data is received one after another in step 501 and unit data is taken out in step 502. Since a credit company name exists as data at the leading top of the unit data as shown in FIG. 8, it is checked in step 503 whether or not the credit company name is adaptive to a terminal of a member store. For example, at a member store which deals with only the cards of "A" company, no data other than the data of "A" company is stored (no in step 503), and the next data is received. If the received data is that supplied from the "A" company (yes in step 503), the data is stored in the second memory portion 113 in step 504.

FIG. 10(b) shows a reading process of card information. If a credit card of a member is inputted (yes in step 505) into the card reader 111 in step 505 (no in step 505 is waiting for insertion of a card), the ID number of the credit card is read in step 506, and the card information pertaining to the ID number of the corresponding card is selectively read from the second memory portion in step 507.

In step 508, reference is made to the card information stored in the second memory portion 113, wherein it is judged whether or not the credit card inputted into the card reader 111 is described in the black list or exceeds the limit of creditability or whether or not the remaining usable amount is shorter than the amount intended to purchase. When the corresponding credit card is adaptive to the permit conditions with respect to the charges forward, indication of VALID or OK is displayed on the display 112 in step 509, and if the permit conditions are not satisfied, indication of INVALID or NG is displayed on the display 112 in step 510.

However, there is a case where an unforeseen accident may occur in the transmission system of the card information to be sent from the card management center 1 to each of the member stores 2, and especially in a case where the transmission is wireless, there is a fear that the card information can not be normally transmitted by influences due to the weather conditions. Therefore, the invention is provided with a feature of checking the reliability of the transmitted card information as a countermeasure in a case where any abnormality occurs in the transmission of the card information.

This feature can be achieved by a data extracting function, storing function, data missing detection function, request function, transmission function and receiving function of a terminal computer 110, wherein the missed data is again transmitted from the card management center 1 in response to a transfer request issued by a terminal computer 110 of the respective member stores 2. In the invention, the transfer request is a "missed data transfer request" requested to the card management center 1 through a telephone line 50, and the host computer 104 of the card management center 1 makes a reply to a terminal computer 110 of the member store 2 that requested data of a packet number through the telephone line 50, in response to the transfer request.

Figure 11:
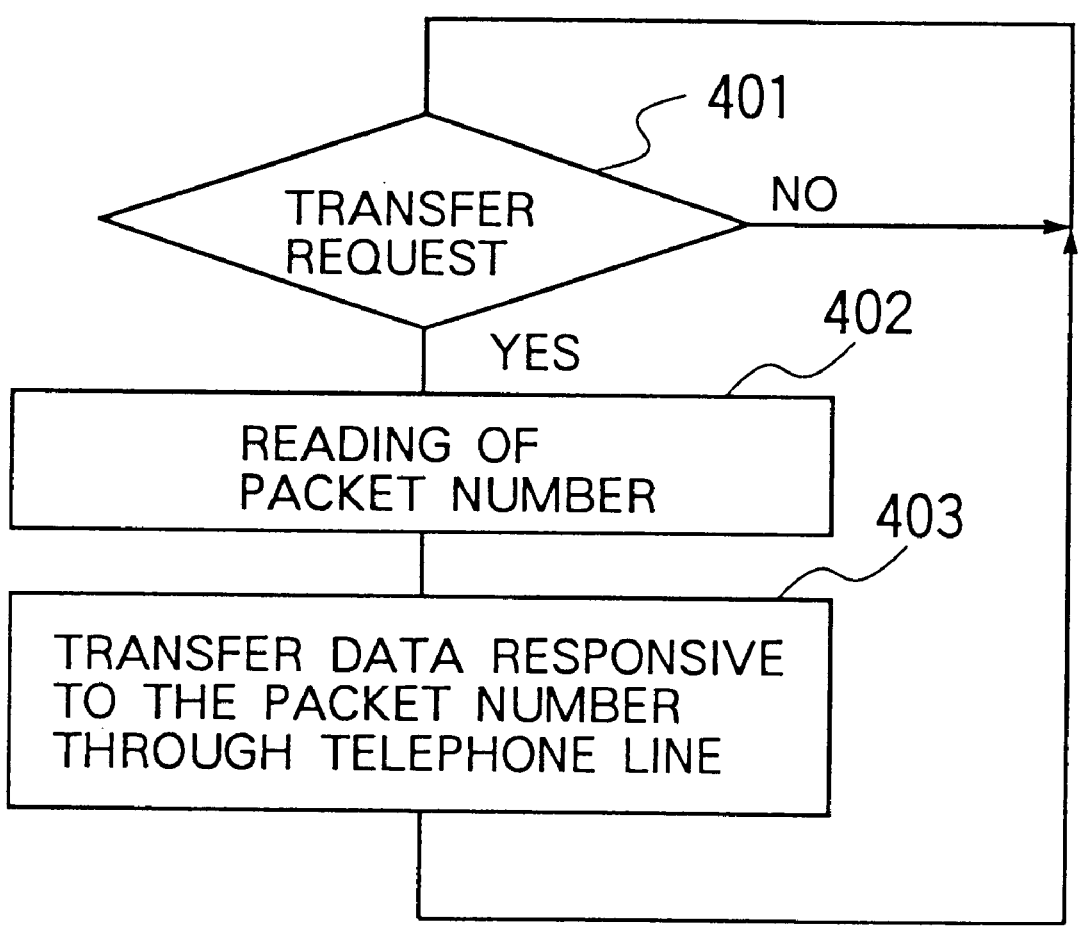
FIG. 11 is a flow chart of a data transfer routine of the host computer.

FIG. 11 shows a data transfer routine of the host computer 104 in the abovementioned preferred embodiment. In this drawing, the host computer 104 waits for a transfer request executed through a telephone line by a terminal computer 110 in step 401. If requested, in step 402 the host computer 104 reads which packet is to be transferred, In step 403, the host computer 104 transfers the data responsive to the packet number through the telephone line 50.

Figure 12:
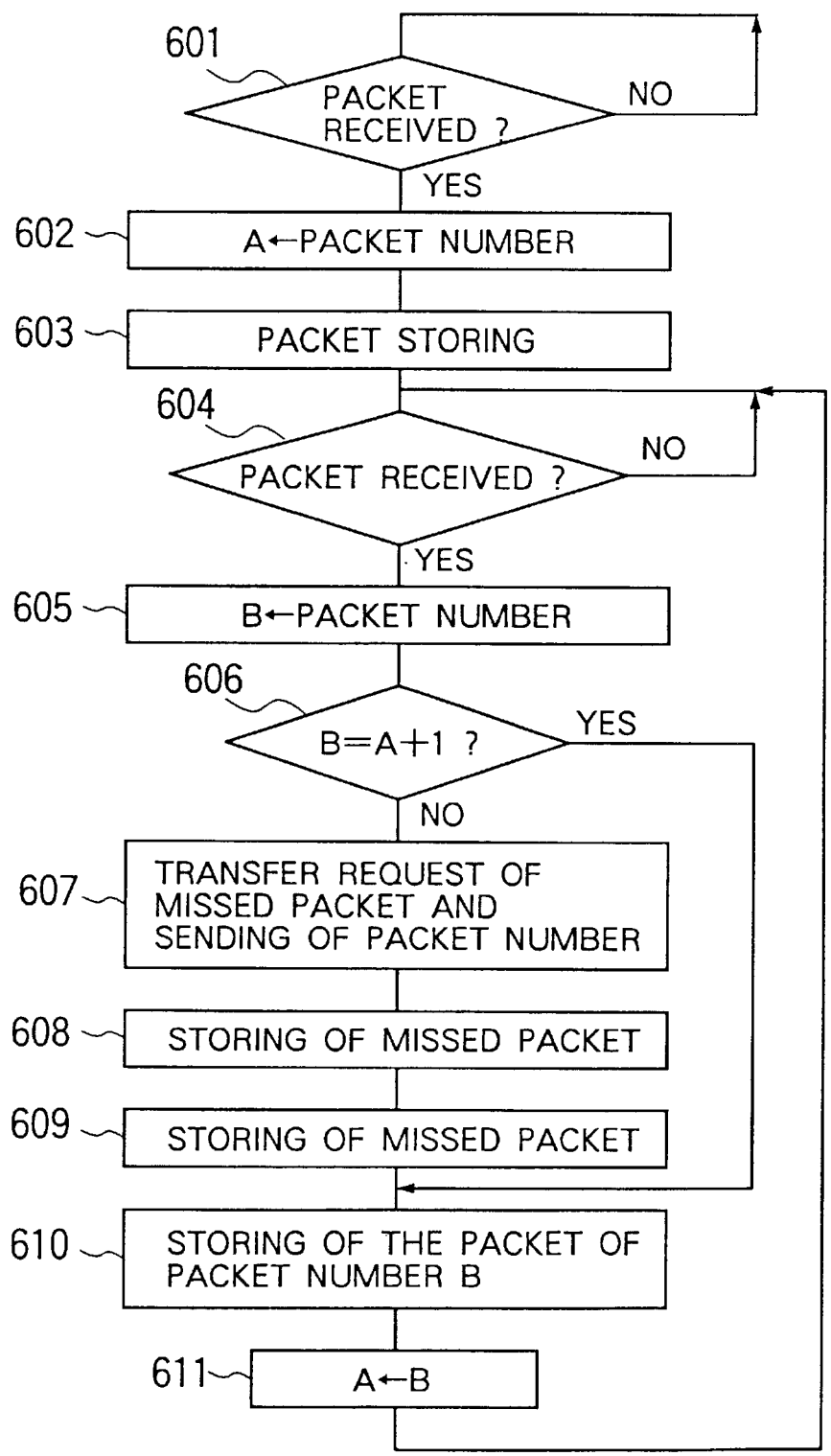
FIG. 12 is a process flow chart of a data storing routine of a terminal computer.

FIG. 12 shows a process of data storing routine which is able to achieve functions of data extraction, storing of data and detecting of any missing thereof in the terminal computer 110. In FIG. 12, the terminal computer 110 waits for receiving of a packet in step 601. As the packet is received, the packet number is stored in the register A in step 602. In step 603 the content of the packet is stored in the second memory portion 113. The terminal computer 110 waits for receiving a packet in step 604. After the packet is received, the packet number is stored in the register B in step 605, and the data is checked for any missing thereof in step 606. If B=A+1 (yes in step 606), no data missing occurs and goes to step 610. Furthermore, where the final value of the packet number is made "E" in calculation of addition [+], E+1=0 is defined. This means that the packet number next to E is 0. If any data is missed (no in step 606), the terminal computer 110 sends, in step 607, a transfer request of the missed packet and the packet number thereof to the host computer 104 through a modem 114.

In step 608, the missed packet transferred through the telephone line 50 is received, and the missed packet is stored in the second memory portion 113 as formal data in step 609. Thereafter, in step 610, the wirelessly transmitted packet is received, and the same is stored in the second memory portion 113. In step 611, the content of the register B is stored in the register A, and the process returns to step 604. In the preferred embodiment, although the continuity of packet numbers is utilized, continuous numbers are provided in the data as shown in FIG. 6, and this continuity may be utilized, or both of them may be used. Still furthermore, although the flow chart illustrated in FIG. 12 shows a case where the data has been transmitted in the sequence of packet numbers, the data may be transmitted at random. That is, packet receiving has been continued in a fixed duration of time, and it is checked whether or not data is missed from the packet number carrying 0 to that having a finish flag. If there is any missed data, the terminal computer 110 requests the data to the host computer 104.

In the invention, the card information includes the credit information, accident information of all the customer members of credit companies ("A" company, "B" company, "C" company, . . .). When a customer member purchases goods or service at a member store of credit companies using his credit card, only "valid" cards are permitted to conclude a "charges forward contract" with a credit company, and cards appearing in the "black list" can not be used and are "invalid". The content of the card information is identical to that of the CAT on-line reference. However, with the present invention, this card information is transmitted from the card management center 1 to member stores 2 and stored in the second memory portion 113 of a terminal computer 110 of the member stores 2, wherein only the card information of a credit card inputted in the card reader is selectively read out from the second memory portion 113, thereby enabling a judgement of "Valid" or "Invalid" without reference to the card management center.

The card information transmitted from the card management center includes the card information of all the customer members of all the credit companies and can be transmitted periodically or from time to time. Herein, if a member store has the basic card information data, the card management center may transmit only the information of new customer members or for which the validity changes, including cases where a credit card is turned from valid to invalid or from invalid to valid, wherein member stores may renew the memory content on the basis of the card information for which the validity changes. Member stores are able to extract only the data required for their own use, of the card information transmitted from the card management center as digital data, and store the data in memory. That is, it is not necessary to store all the data of the card information which is transmitted by the card management center.

In the invention, terminal computers 110 of member stores 2 check the correlation with the packets received in the past with respect to the data packets of wirelessly transmitted digital data and detect any data missing of the extracted data. If there is any missing of the data, the terminal computers 110 immediately make a request to the host computer 104 for the missed portion of data through a telephone line 50, receive a response of the missed data therefrom and store the same in the second memory portion 113, whereby it is possible to take out the card information as necessary.

According to the invention, each of the member stores is always able to secure the newest card information and such an effect can be held, where it is possible to judge the creditability of a credit card inputted into a card reader without depending on any CAT terminal.

What is claimed is:

1. A credit card information management system, comprising:

a host computer located at a card management center, a transmission facility connected to the host computer for broadcasting wirelessly digital data signals of card information in the host computer, said card information including classification of validity of credit cards of customer members of a credit company and information of creditability, receiving facilities equipped in member stores of the credit company for receiving the digital data signals broadcasted by the transmission facility, card readers located at the member stores for reading the credit cards of credit card users, terminal computers located at the member stores and connected to the respective receiving facilities to receive the digital data signals therefrom, each of the terminal computer receiving the card information broadcasted through the transmission facility, selecting the card information for each of the member stores, storing including renewing the selected card information in a memory and outputting a card information of a credit card inputted into the card reader, each terminal computer having a modem, a data extracting feature, a memory feature, a data missing detection feature, a request feature, a transmission feature and a receiving feature, said data extracting feature extracting a specified portion of digital data outputted from the receiving facility and outputting the data to the memory feature and the data missing detection feature, said memory feature storing the data outputted from the data extracting feature and data inputted from the receiving feature to compensate the missing data, said data missing detection feature analyzing correction between output from the data extracting feature and the data received in a past and outputting a data request instruction to the request feature by detecting missing data, said request feature requesting data of the missing portion to the transmission feature if there is a missing portion, said transmission feature sending request data of the missing portion to the host computer, and said receiving feature receiving data corresponding to the missing portion responded by the host computer and outputting the same to the memory feature, and telephone lines connected between the host computer and the respective terminal computers through the modems, wherein said host computer has a function of responding to the terminal computer to send the missing data through the telephone line upon request from the terminal computer so that in case the terminal computer finds that there is the missing data in the received card information, the terminal computer requests the missing data to the host computer through the telephone line, and stores the missing data in the memory after receiving the missing data from the host computer through the telephone line.

2. A credit card information management system as set forth in claim 1, wherein said transmission facility is an FM multiplex broadcasting facility, and said receiving facilities of the member stores receive the card information broadcasted in FM multiplex, each terminal computer extracting only the card information necessary for its own use and storing the card information in the memory, judgement of validity of a credit card inputted into the card reader and output of creditability information of a customer member being carried out on the basis of content of the memory.

3. A credit card information management system as set forth in claim 1, wherein said data missing detection feature checks continuity of packets with respect to a series of data packets from the data extracting feature and judges a missing of data when no continuity is confirmed.

4. A credit card information management system as set forth in claim 3, wherein the packets are composed of prefixes and data blocks.

* * * * *